Feb. 3, 1925. Re. 15,990

H. A. SCHWARTZ

METHOD OF CASTING

Original Filed June 8, 1921

Inventor
Harry A. Schwartz
Albert M. Austin
Attorney

Reissued Feb. 3, 1925. Re. 15,990

UNITED STATES PATENT OFFICE.

HARRY A. SCHWARTZ, OF CLEVELAND, OHIO.

METHOD OF CASTING.

Original No. 1,428,987, dated September 12, 1922, Serial No. 475,968, filed June 8, 1921. Application for reissue filed August 22, 1924. Serial No. 738,108.

*To all whom it may concern:*

Be it known that I, HARRY A. SCHWARTZ, a citizen of the United States, formerly a resident of Defiance, in the county of Defiance in the State of Ohio, and now residing at Cleveland, in the county of Cuyahoga and the State of Ohio, have invented a new and Improved Method of Casting, of which the following is a full, clear, and exact description.

This invention relates to improvements in method of casting, and more particularly to an improved method of casting in permanent molds, an object of the invention being to maintain within a constant range, the temperature of the mold during the casting operations and between casting operations where the molds are used continuously, so that uniform castings may be made in permanent molds without material or injurious deterioration of the mold itself.

I am, of course, aware that it is old in the art of casting to cast in permanent molds and it is also old to chill or cool molds, but I believe that I am the first to cast in molds where the mold is maintained within a constant range of temperature.

The art of casting in permanent molds has been developed extensively in the low melting alloy metal field by the die casting process; that is, forming castings of alloy metal in metal dies by placing the metal in the dies under pressure. The cause of the development of this particular field is due to the fact that alloys of comparatively low melting temperature are used, the dies or molds not being subjected to the comparatively extreme temperatures which are necessary in the metal group, such as iron, etc.

When permanent molds, such as heretofore used, are subjected to extreme heat and allowed to cool repeatedly, they will deteriorate to a more or less rapid extent. Also after pouring for a time, the molds become very hot, so that castings cannot be made in as frequent intervals as when the molds were cooler.

With ordinary permanent molds, when the cast iron is poured in the heat from the molten metal is extracted very quickly depending upon the size of the casting made. Segregation in this way is largely prevented, the metal setting so quickly that segregation cannot take place to a large extent, but permanent molds such as ordinarily made do not have any control of temperature but rely solely upon a reduction of temperature or a carrying away of the heat units by radiation or chilling. The problem, therefore, of casting metals having a high melting point in permanent molds resolves itself into the question of first taking away from the mold the heat that it has taken from the casting made in it until the casting is set, and then maintaining a comparatively uniform temperature for a desired length of time between pourings and finally allowing the casting separated from the mold to cool as gradually as may be desired, and I can accomplish this purpose in molds of the same metal as the castings without danger in any way of injuring the mold but on the other hand permitting a repeated use of the mold.

Furthermore, the physical properties of the metal, such for example as iron castings, are improved considerably when cast in permanent molds. When cast iron sets from the molten stage, the elements which make up the cast iron composition tend to segregate to a large extent. If this segregation is largely prevented the physical properties are improved, and it is one purpose of my invention to provide a method of casting whereby the temperature of the mold is controlled and stablized so that the segregation can be prevented in so far as it is desirable to do so.

In casting metals having a relatively high melting point, for example, above 1000 degrees Fahrenheit in permanent molds, the following five factors govern to a large extent the process:

1. Temperature control of the molten iron or other metal at the pouring.
2. Controlling the molten stream, as to cross-section and flow when entering the mold.
3. Maintaining the mold at an even and constant temperature range.
4. Controlling the ejection of the casting on its completion.
5. Preserving the physical condition of the mold.

All of these factors must be considered to produce the best results, but in the present process emphasis is particularly laid upon the third element, "maintaining the mold at an even and constant temperature range", and the fifth element "preserving the physical condition of the mold."

A further object is to provide a method of the character stated which not only results in the making of superior castings but which lengthens the life of the mold and increases the output or effectiveness of the mold operation.

With these and other objects in view the invention consists in certain novel features of temperature control of the mold and means and steps in the operation of controlling the temperature of the mold during the casting operations as will be more fully hereinafter described and pointed out in the claims.

In the accompanying drawings—

Figure 1:
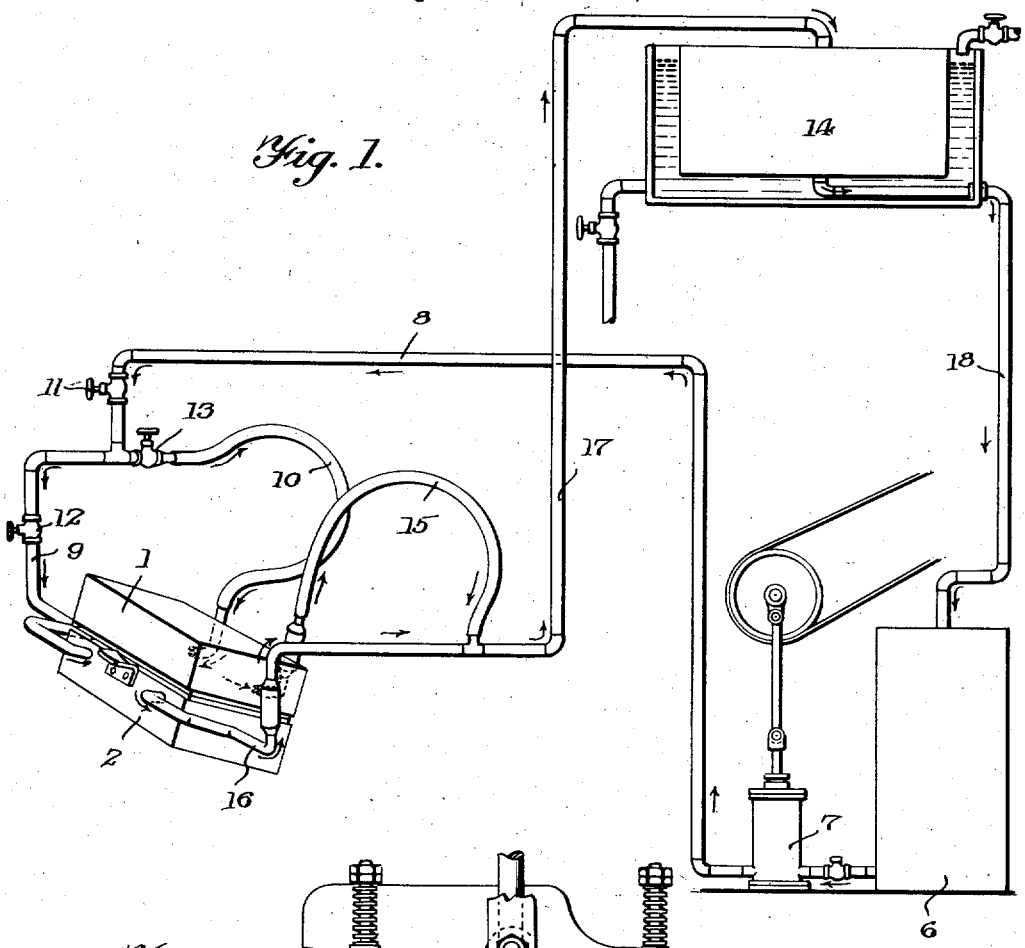
Figure 1 is a view showing more or less diagrammatically an apparatus in which my improved method of casting can be carried out.
Figure 2:
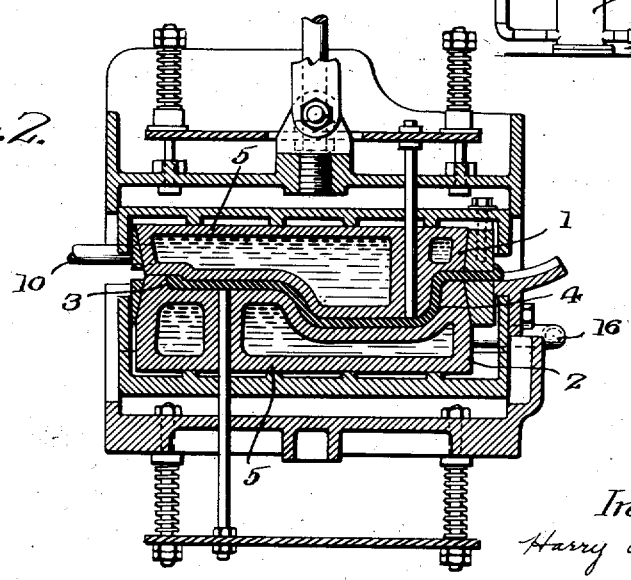
Figure 2 is a view in longitudinal section through the mold.

I would have it understood that this invention is not limited to any particular form of mold or mold support, although it is to be understood that the mold will be preferably of metal, comprising two or more sections 1 and 2 having a mold space 3 between them in which the casting 4 is formed. The mold sections 1 and 2 are hollow forming fluid chambers 5 and these fluid chambers may be arranged and shaped in any desired way to give the best results.

In carrying out my improved method I preferably employ a storage tank or reservoir 6, from which the fluid is forced by means of a pump 7 through a pipe 8 and branch pipes 9 and 10 into the fluid chambers 5 of the upper and lower mold sections. In this pipe 8 and in the branch pipes 9 and 10 I provide manually operated valves 11, 12 and 13 respectively, so that the flow of fluid through the mold sections can be controlled.

14 represents a refrigerating device of any approved construction, and I do not wish to be limited to the arrangement of tank shown and may employ any refrigerating device desired. Branch outlet pipes 15 and 16 communicate with the upper and lower mold sections 1 and 2 respectively and discharge into a pipe 17 communicating with the condenser tank 14 and a pipe 18 connects the condenser tank with the storage tank 6 so that a circulation may be maintained or cut off as desired.

While I have illustrated in the drawings as a cooling or temperature controlling medium a liquid, it is obvious that I may employ any fluid either gas or liquid which will perform the functions intended. I do not claim, however, the use of water as a temperature controlling medium or any fluid that is not in a relatively stable fluid state above the boiling point of water and is not in a fluid state below the critical temperature of water, or that does not possess the thermal properties of comparatively ready heat-absorption and heat-conduction. A well known example of a fluid having the desired characteristic is mineral oil, and I expressly disclaim the use of fluids such as water.

It is to be understood that the system is preferably full of the fluid so that when the pump 7 is operated the fluid will be caused to circulate through the system as rapidly as the position of the valves 11, 12 and 13 will permit.

In carrying out the method the molten metal is poured into the mold, and when pouring large castings it is preferable at the initial pouring to have the valves 11, 12 and 13 wide open so that a maximum flow of the temperature-controlling fluid will be had through the chambers 5 of the mold to cool the casting and rapidly carry away the heat in excess of the predetermined mold temperature. This rapid cooling accomplishes the purpose of largely preventing segregation of the elements of the casting. When pouring a run of small castings the flow is cut down by partially closing the valves and may be cut down as much as desired to maintain the temperature of the mold, or the flow may be regulated to permit a slow decline in temperature thereby to cool the casting as slowly or as quickly as desired and to maintain the mold at a certain temperature for a period of time between pourings and then cool it to remove the heat in excess of the predetermined temperature added by each pouring, all of which temperature regulation is under the control of the operator by simply manipulating the valves 11, 12 and 13.

It is, therefore, apparent that in carrying out my improved method of casting the temperture regulation above referred to not only includes a reduction of temperature, thereby to carry away the heat in excess of the predetermined temperature range as it is conveyed to the mold from the successive pourings, but the rapidity of such reduction, and hence the element of time enters into the operation so that the temperature can be maintained or decreased as desired and always under the control of the operator.

It is to be understood that by temperature regulation I not only include by such a term a reducing of temperature, but more particularly a method whereby the mold may be maintained at a relatively constant temperature for the desired length of time for a run of castings.

In carrying out my improved method of casting in permanent molds whereby the temperature of the mold is regulated and stabilized, I employ a closed temperature-controlling fluid circuit with means in the circuit for establishing a desired temperature for the fluid and with means in the circuit for controlling the amount of fluid in transit. Fig. 1 illustrates clearly the closed circuit; 14 represents the means for establishing a desired temperature for the fluid and the valves 11, 12 and 13 indicate the means for controlling the amount or quantity of fluid in circuit to and through the mold. Without these features of control I am convinced that no proper temperature regulation can be had in a run of castings in a permanent mold. In carrying out my improved method of such regulation I am enabled to reduce the temperature of the mold and the castings as rapidly as desired, maintain the mold temperature uniform within the predetermined range or gradually decrease the temperature to carry away excess heat as may be desired, so that there may be in truth and in fact a real temperature regulation.

I expressly disclaim, however, the maintenance of any mold temperature range which includes the decalescence point of the mold material, or which is at or below the boiling point of water. The predetermined temperature range within the given limits depends on the material of the mold, the heat of the molten metal, the size and character of the castings, and the interval between successive pourings. For example, in making a small thin iron casting in a permanent ferrous mold satisfactory results have been obtained by stabilizing the temperature during a run of castings made at about one minute intervals at approximately 500 degrees Fahrenheit within a constant range of approximately 100 degrees Fahrenheit from a mean temperature. It will be understood, of course, that the mean temperature determined for the mold and the fluctuations therefrom may be raised or lowered in practice depending on the character of the mold and the casting or both.

The last step in the method where it is desired to obtain smooth finished castings without machining, is to inject the castings into an asbestos powder or treat the same in any well known manner which will prevent surface oxidation.

It is obvious that the invention is not limited to the particular apparatus above described, as I desire to cover broadly the idea of temperature regulation for molds of the type set forth, whereby castings are formed on a productive scale without substantial or injurious deterioration of the permanent mold, which I believe is an improvement in the art, and furthermore, I believe the entire operation of casting in accordance with my method results in economy and in better results to the trade.

Having thus described my invention I claim:

1. The herein described method of casting, consisting in introducing molten metal into a mold, and maintaining the mold within a constant range of temperature.

2. The herein described method of casting, consisting in providing a pair of permanent mold members, introducing molten metal between the mold members, and maintaining the mold within a constant range of temperature.

3. The herein described process of casting, consisting in casting molten metal in a permanent mold of the same metal as the casting, said mold members having chambers therein, and during the process of cooling the casting in the mold, maintaining the mold within a constant range of temperature, by the movement of the fluid through the chambers.

4. The herein described method of casting, consisting in providing a pair of mold members having fluid chambers therein, introducing molten metal between the mold members, causing a circulation of a cooling fluid through said chambers, and controlling the flow of said fluid to maintain the mold within a constant range of temperature.

5. The herein described method of casting, consisting in casting in a permanent mold, and during the time the casting is in the mold and after the casting is ejected from the mold, maintaining a constant range of temperature of the mold.

6. The herein described method of casting metals having a relatively high melting point which consists in repeatedly introducing molten metal into a permanent mold and separating castings therefrom and maintaining the mold during a run of castings within a constant range of temperature by circulating a non-aqueous, heat absorbing and heat-conducting liquid near the casting cavity.

7. The herein described method of casting metals having a relatively high melting point, which consists in repeatedly introducing molten metal into a permanent mold and separating the castings therefrom and maintaining the mold during a run of castings within a constant range of temperature by circulating oil through the mold.

8. The herein described method of casting metals having a relatively high melting point, which consists in pouring the molten metal into a permanent mold, and maintaining the mold within a constant range of temperature by circulating a non-aqueous, temperature-controlling liquid near the casting cavity and regulating the temperature of the liquid outside of the mold.

9. The method of casting materials having a relatively high melting point in permanent molds, which consists in causing circulation through the mold near the casting cavity of a non-aqueous, heat-absorbing and heat conducting fluid during a run of castings and establishing and maintaining a predetermined range of mold temperature above the boiling point of water and below the point at which said mold deteriorates.

10. The method of casting metals having a relatively high melting point, which consists in transferring heat initially received by the mold from the cast metal by circulating a non-aqueous, heat-absorbing fluid in he mold near the casting cavity, and conrolling the flow of the fluid to stabilize and maintain the temperature of the mold during the casting period within a predetermined range not including the decalescent temperature of the metal and above the boiling point of water.

11. The method of casting materials having a relatively high melting point in permanent molds, which consists in stabilizing the mold temperature by passing a regulated quantity of non-aqueous, temperature-controlling fluid near the casting cavity and varying the quantity of fluid to counteract the tendency of the mold temperature to rise or fall above or below the predetermined temperature range.

12. The herein described method of casting iron in a permanent ferrous mold which comprises introducing metal into the mold and circulating oil near the casting cavity and varying the rate of circulation in accordance with the amount of heat passed to the mold to maintain the temperature of the mold within a given range during a run of castings.

13. The herein described method of casting iron in a permanent ferrous mold having a chamber in proximity to the casting cavity, which comprises circulating oil through said chamber and varying the rate of circulation in accordance with the amount of heat passed to the mold to prevent fluctuations of the temperature of the mold to or below the boiling point of water or above the temperature at which the mold metal deteriorates.

14. The herein described method of casting which consists in successively pouring molten material into a permanent ferrous mold and separating the castings therefrom, and during and between the time that the castings are in the mold maintaining the same within a constant range of temperature having fluctuations of not more than 100° F. above or below a predetermined point, the range of temperature being above the boiling point of water and below the temperature at which the mold metal deteriorates.

15. The herein described method of preserving the material of a permanent mold against deterioration which comprises keeping the temperature of the mold material within a given range during casting operations and between successive casting operations.

16. The herein described method of preserving the material of a permanent mold against deterioration which comprises circulating a non-aqueous fluid in contact therewith to keep the temperature of the mold material within a given range during casting operations.

17. The herein described method of preserving the material of a permanent mold against deterioration which consists in keeping the mold during the casting operation at such temperature that substantial molecular changes do not occur in the mold material.

Signed at New York, in the county of New York and State of New York, this fifteenth day of August, A. D. 1924.

HARRY A. SCHWARTZ.